United States Patent Office 3,077,576
Patented Feb. 12, 1963

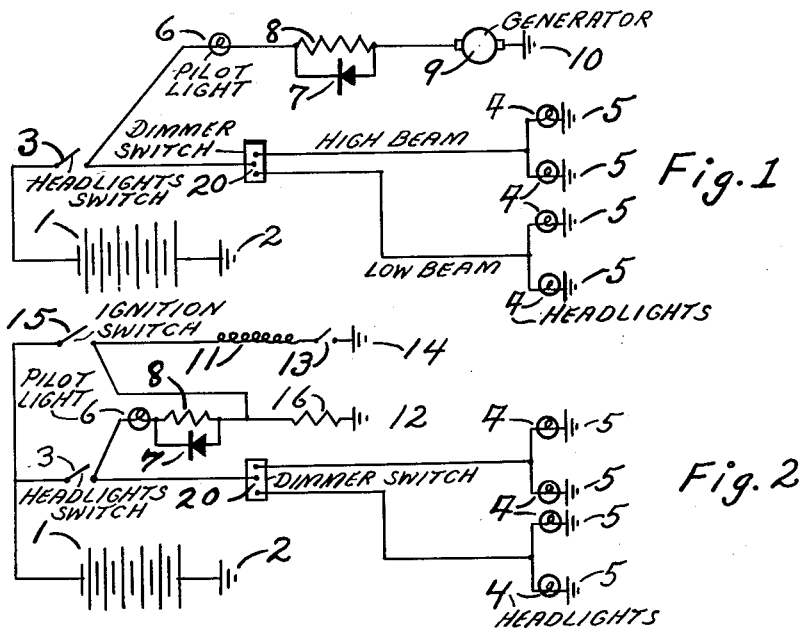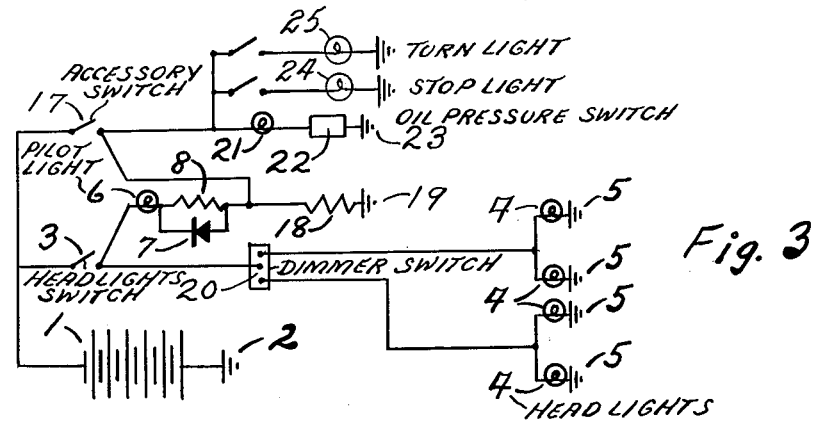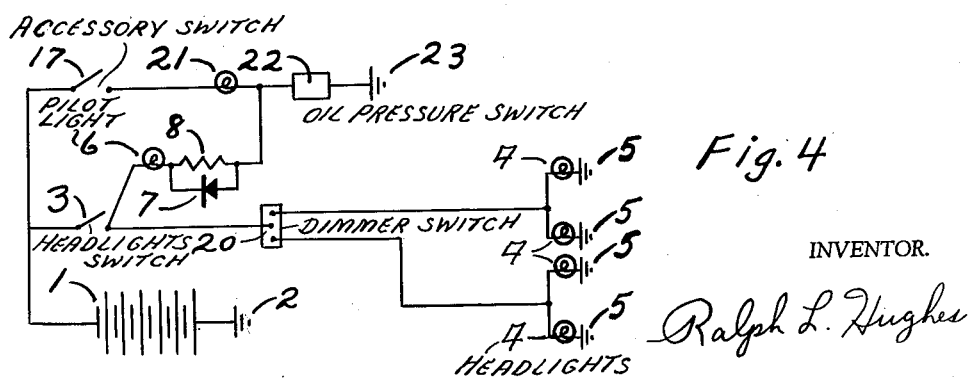

3,077,576
AUTOMOBILE ALARM SYSTEM
Ralph L. Hughes, Los Angeles, Calif.
Filed Oct. 26, 1959, Ser. No. 848,866
2 Claims. (Cl. 340—52)

This invention relates to headlight reminder alarm systems for motor vehicles and has for its purpose the lighting of an alarm indicating warning lamp to remind the motor vehicle operator to turn the vehicle's headlights on before driving at night.

A further purpose of this invention is the lighting of the warning lamp to remind the vehicle operator to turn the vehicle's headlights off whenever the vehicle is parked, either in daylight or darkness, with its motor turned off and its headlights left on.

A further purpose of this invention is to provide means for automaticaly shutting off the warning lamp when the vehicle's motor is running and the headlights are turned on and also when the vehicle's motor is stopped and its headlights are turned off.

Further features of this invention and further objects to be attained will be described in the following specifications. It is to be understood that the invention resides mainly in the alarm indicating warning lamp connected in series with a resistor and rectifier in parallel and connected between an electrical circuit of the motor vehicle that is normally energized whenever the vehicle's motor is running and a point on the vehicles headlights circuit between the headlights switch and the headlights high-beam, low-beam selector switch or dimmer switch, as described and shown in the specifications and drawings, and as claimed; the description of several applications of this headlight reminder alarm system is not intended to be limitive, but rather to show by a few examples how this combination of warning lamp, resistor and rectifier can be used in a headlight reminder alarm system. Many changes, especially with regard to specific details mentioned may, therefore, be made without departing from the essence of the invention.

More specific objects and features of this invention will become apparent from the following description when considered in connection with the accompanying drawings, in which—

FIGURE 1 is a drawing of the headlight reminder alarm circuit comprising an electric lamp, electrical rectifier and an electrical resistor connected between the ungrounded lead to the armature of the motor vehicle's electrical generator and a point on the vehicle's headlights circuit between the headlights switch and the headlights dimmer switch.

FIGURE 2 is a drawing of the headlight reminder alarm circuit comprising an electric lamp, electrical rectifier and electrical resistor connected between the motor vehicle's ignition circuit and a point on the vehicle's headlights circuit between the headlights switch and the dimmer switch.

FIGURE 3 is a drawing of the headlight reminder alarm circuit comprising an electric lamp, electrical rectifier and electrical resistor connected between an electrical accessories circuit of the motor vehicle and to a point on the headlights circuit between the headlights switch and the headlights dimmer switch.

FIGURE 4 is a drawing of the headlight reminder alarm circuit comprising an electric lamp, electrical rectifier and an electrical resistor connected between the ungrounded side of the motor vehicle's low oil pressure alarm switch and to a point on its headlights circuit between the headlights switch and the headlights dimmer switch.

The invention consists of an alarm indicating circuit composed of a parallel circuit of an electrical resistor and an electrical rectifier connected in electrical series with an alarm indicating warning lamp, the entire alarm circuit being connected between an electrical circuit of a motor vehicle that is normally electrically energized only when the vehicle's motor is running and a point between the vehicle's headlights switch and its headlights dimmer switch. If desired, this parallel circuit consisting of the electrical resistor and the electrical rectifier may be in the form of a leaky, partial or semi-rectifier that allows a large electrical current to flow in its forward direction to produce a bright light in the alarm indicating lamp when the vehicle's headlights are on and its motor is not running, and to allow only a small electrical current to flow in its reverse direction to produce a dim or weak light in the warning lamp when the vehicle's motor is running and its headlights are not turned on.

As shown in FIGURE 1 the headlight reminder alarm system consists of an electrical resistor 8 connected in electrical parallel with an electrical rectifier 7 and also connected in electrical series with a headlight reminder alarm indicating lamp 6. This headlight reminder alarm system may be electrically connected to a motor vehicle between the ungrounded terminal of the vehicle's electrical generator armature 9 and the vehicle's headlights circuit at a point between the headlights switch 3 and the headlights dimmer or high-beam, low-beam selector switch 20.

As shown in FIGURE 2 the headlight reminder alarm system, consisting of the lamp 6, resistor 8 and the rectifier 7, may be connected between the headlights circuit of a motor vehicle and its ignition circuit.

As shown in FIGURE 3 the headlight reminder alarm system, consisting of the lamp 6, rectifier 7 and resistor 8, may be connected between the headlights circuit of a motor vehicle and its electrical accessory switch 17 that is normally closed whenever the vehicle's motor is running.

As shown in FIGURE 4 the headlight reminder alarm system, consisting of the lamp 6, rectifier 7 and the resistor 8, may be connected between the headlights circuit of a motor vehicle and the ungrounded side of its low oil pressure alarm switch 22.

The operation of the headlight reminder alarm system when connected to a motor vehicle as shown in FIGURE 1 is as follows:

When the operator starts the vehicle's motor running an electrical voltage will be generated in the generator armature 9 of the motor vehicle. Since this voltage cannot force an electrical current in a reverse direction through the blocking rectifier 7 it forces a reduced or limited current through the electrical resistor 8, headlight reminder alarm indicating warning lamp 6, headlights dimmer switch 20, headlight lamps 4 and back to the generator armature 9 again through the grounded connections 5 and 10. This comparatively small electrical current flowing through lamp 6 produces a very weak or dim light that is not noticeable during bright daylight but when daylight turns to darkness this weak or dim light in lamp 6 appears much brighter and serves to remind the vehicle operator to turn on the vehicle's headlights before driving at night. When the headlights are then turned on by closing the headlights switch 3 a nearly equal voltage of the same polarity as that of the armature 9 will be impressed on the lamp 6 from the vehicle's battery 1 and little or no current will flow in lamp 6, shutting off its light.

When the headlights switch 3 is in a closed position and the vehicle's motor is not running a comparatively large electrical current will flow from battery 1 through the headlights switch 3, lamp 6, through the rectifier 7 in a forward direction, and back to the battery 1 again through the generator armature 9 and grounded connections 10 and 2. This large current, which is not now limited by the resistor 8, produces a bright light in the alarm indicating lamp 6 and serves to remind the vehicle operator to turn off the vehicle's headlights, either in daylight or darkness. When the headlights are then then turned off the alarm circuit becomes de-energized and the light in lamp 6 goes out.

The rectifier 7 permits a large current to flow through lamp 6 from the headlights switch 3 to the generator armature 9 whenever the headlights are on and the vehicle's motor is not running, producing a bright light in lamp 6.

The resistor 8 permits only a very small current to flow through lamp 6 from the generator armature 9 to the headlight lamps 4 whenever the vehicle's motor is running and its headlights are not turned on, producing a very weak or dim light in lamp 6.

The operation of the headlight reminder alarm system when connected to the ignition circuit of a motor vehicle as shown in FIGURE 2 is as follows:

When the motor vehicle operator closes the ignition switch 15 for operating the vehicle's motor a small electrical current will flow from the battery 1, FIGURE 2, through the ignition switch 15, current limiting resistor 8, headlight reminder alarm indicating lamp 6, headlights dimmer switch 20, headlight lamps 4 and back to the battery 1 through the grounded connections 5 and 2. This small current through lamp 6 produces a very weak or dim light in lamp 6 that is not noticeable in daylight but appears brighter when darkness falls and serves to remind the operator to turn on the vehicle's headlights before driving at night.

When the headlights are then turned on by closing the headlights switch 3 an equal voltage of the same polarity is impressed against both ends of the headlight reminder alarm circuit and no current will flow through lamp 6 so its light goes out.

Whenever the ignition switch 15 is opened while the headlights are still on a large current will flow from the battery 1 through the headlights switch 3, lamp 6, rectifier 7 (in its forward direction), ignition coil 11, breaker switch 13 (if it is closed), also through a resistor 16, if used, and back to battery 1 through the grounded connections 14, 12 and 2. This large current flowing through lamp 6 and rectifier 7 produces a bright light in lamp 6 that is easily seen in daylight or darkness and serves to remind the operator to turn off the vehicle's headlights before leaving the parked vehicle.

The operation of the headlight reminder alarm system when connected to the ignition key operated electrical accessory circuit of a motor vehicle as shown in FIGURE 3 is as follows:

When the operator closes the ignition switch of the vehicle to operate its motor the electrical accessory circuit switch 17, FIGURE 3, also closes. This circuit usually operates the vehicle's stop lights 24, radio, turn indicator lights 25, low generator voltage alarm and low oil pressure alarm signal lamps, etc., and is normally energized by the vehicle's battery whenever the vehicle's motor is running.

The closing of switch 17 permits a very small electrical current to flow from battery 1 through switch 17, current limiting resistor 8, headlight reminder alarm indicating lamp 6, headlight dimmer switch 20, headlight lamps 4 to battery again through grounded connections 5 and 2. This small current produces a very weak or dim light in lamp 6 to remind the operator to turn on the vehicle's headlights before driving at night.

When the headlights switch 3 is then closed to turn on the headlights the equal voltage at each end of the headlight reminder alarm circuit prevents current from flowing through lamp 6 and its light goes out.

Whenever the headlights switch 3 is in a closed position and the accessory switch 17 is open a large current will flow from the battery 1 through the headlights switch 3, headlight reminder alarm indicating lamp 6, rectifier 7, through any of the electrrical accessories that may be in use or through a resistor 18, and to the battery return through the grounded connections of said electrical accessories or through the grounded connections 19 and 2. This large current through lamp 6 and rectifier 7 produces a bright light in lamp 6 that serves to remind the operator to turn off the headlights of the parked vehicle. When the headlights are turned off by opening the headlights switch 3 the headlight reminder alarm lamp 6 becomes de-energized and its light goes out.

The operation of the headlight reminder alarm system when it is connected between the ungrounded side of a motor vehicle's low oil pressure alarm switch and a point between the headlights switch and its dimmer switch as shown in FIGURE 4 is as follows: Whenever the motor of the vehicle is running the accessory switch 17 will be closed and its low oil presure alarm switch 22 will be open. This permits a very small electrical current to flow from the battery 1 through switch 17, low oil pressure alarm lamp 21, current limiting resistor 8, headlight remainder alarm indicating lamp 6, headlights dimmer switch 20, headlight lamps 4 and back to the battery 1 through the grounded connections 5 and 2. This produces a very weak or dim light in lamp 6 that serves to remind the operator to turn on the vehicle's headlights before driving at night.

When the headlights are then turned on by closing the headlights switch 3 an equal voltage of the same polarity is then impressed to both ends of the alarm circuit and the light in lamp 6 goes out.

Whenever the headlights switch 3 is closed and the vehicle's motor is not running the low oil pressure alarm switch 22 will be closed. This permits a large current to flow from the battery 1 through the headlights switch 3, headlight reminder alarm indicating lamp 6, rectifier 7, low oil pressure alarm switch 22 to the battery 1 through the grounded frame connections 23 and 2. This large current flowing through lamp 6 produces a bright light in lamp 6 that serves to remind the operator to turn off the vehicle's headlights, either in daylight or darkness.

When the headlights are then turned off the alarm circuit becomes de-energized and the headlight reminder alarm indicating lamp 6 goes out.

It is to be understood that the resistor 8 and the rectifier 7, FIGURES 1, 2, 3 and 4, may, if desired, be combined in the form of a single unit comprising a leaky, partial or semi-rectifier device that passes electrical current freely in its forward direction, but, while permitting a small current to flow, offers considerable resistance to the flow of an electrical current in its reverse direction to produce a very weak or dim light in the lamp 6 when the vehicle's motor is running and its headlights are not turned on.

I claim:

1. A headlight reminder alarm system for a motor vehicle provided with a headlight swtich, a headlight lamp, an electrical battery and an electrical generator comprising, said electrical generator, an alarm indicating signal lamp and a current limiting electrical resistor connected between and in electrical series with said electrical generator and the headlight lamp of said motor vehicle whereby said signal lamp is made operative when said electrical generator is in operation and the motor vehicle headlight switch is in the open position; a series circuit connection through said electrical battery, headlight switch, signal lamp, an electrical rectifier and said electrical generator whereby said signal lamp is also made operative when said headlight switch is in the closed position and said electrical generator is not in operation; circuit means included in said circuits to render said signal lamp inoperative when said electrical generator is in operation and said headlight switch is in the closed position; circuit means included in said circuits whereby a relatively dim light is produced in said signal lamp when said electrical generator is in operation and said headlight switch is in the open position; circuit means also included in said circuits whereby a relatively bright light is produced in said signal lamp when said headlight switch is closed and said electrical generator is not in operation.

2. A headlight reminder alarm system for a motor vehicle provided with an electrical generator comprising: an alarm circuit including an electrical battery, a headlights switch, an alarm indicating pilot lamp, an electrical rectifier and the armature of said electrical generator connected in electrical series circuit whereby said alarm indicating pilot lamp is made operative when said headlights switch is in a closed position and said electrical generator is not in operation; an alarm circuit including said electrical generator, an electrical resistor, said alarm indicating pilot lamp and a headlight lamp connected in electrical series circuit whereby said alarm indicating pilot lamp is made operative when said electrical generator is in operation and said headlights switch is in the open position; circuit means included in said circuits to render said alarm indicating pilot lamp inoperative when said electrical generator is in operation and said headlights switch is in the closed position; circuit means included in said circuits whereby said pilot lamp is made to produce a relatively dim light when said electrical generator is in operation and said headlights switch is in an open position to remind the operator of said vehicle to turn on said vehicle headlights when driving at night; circuit means also included in said circuits whereby said pilot lamp is made to produce a relatively bright light when said headlights switch is in a closed position and said electrical generator is not in operation, to remind the operator of said vehicle to turn off said vehicle headlights before leaving said vehicle unattended, either in daylight or darkness.

References Cited in the file of this patent
UNITED STATES PATENTS

| | | |
|---|---|---|
| 2,571,360 | Hallerberg | Oct. 16, 1951 |
| 2,598,056 | Hollins | May 25, 1952 |
| 2,710,954 | Hallerberg et al. | June 14, 1955 |
| 2,729,806 | Dewhirst | Jan. 3, 1956 |
| 2,759,176 | Kennedy | Aug. 14, 1956 |
| 2,788,514 | Schmitt | Apr. 9, 1957 |
| 2,799,843 | Savino | July 16, 1957 |
| 2,820,215 | Hughes | Jan. 14, 1958 |